Nov. 14, 1961  G. TAZIOLI  3,008,753
PIPE TONGS
Filed Nov. 25, 1958
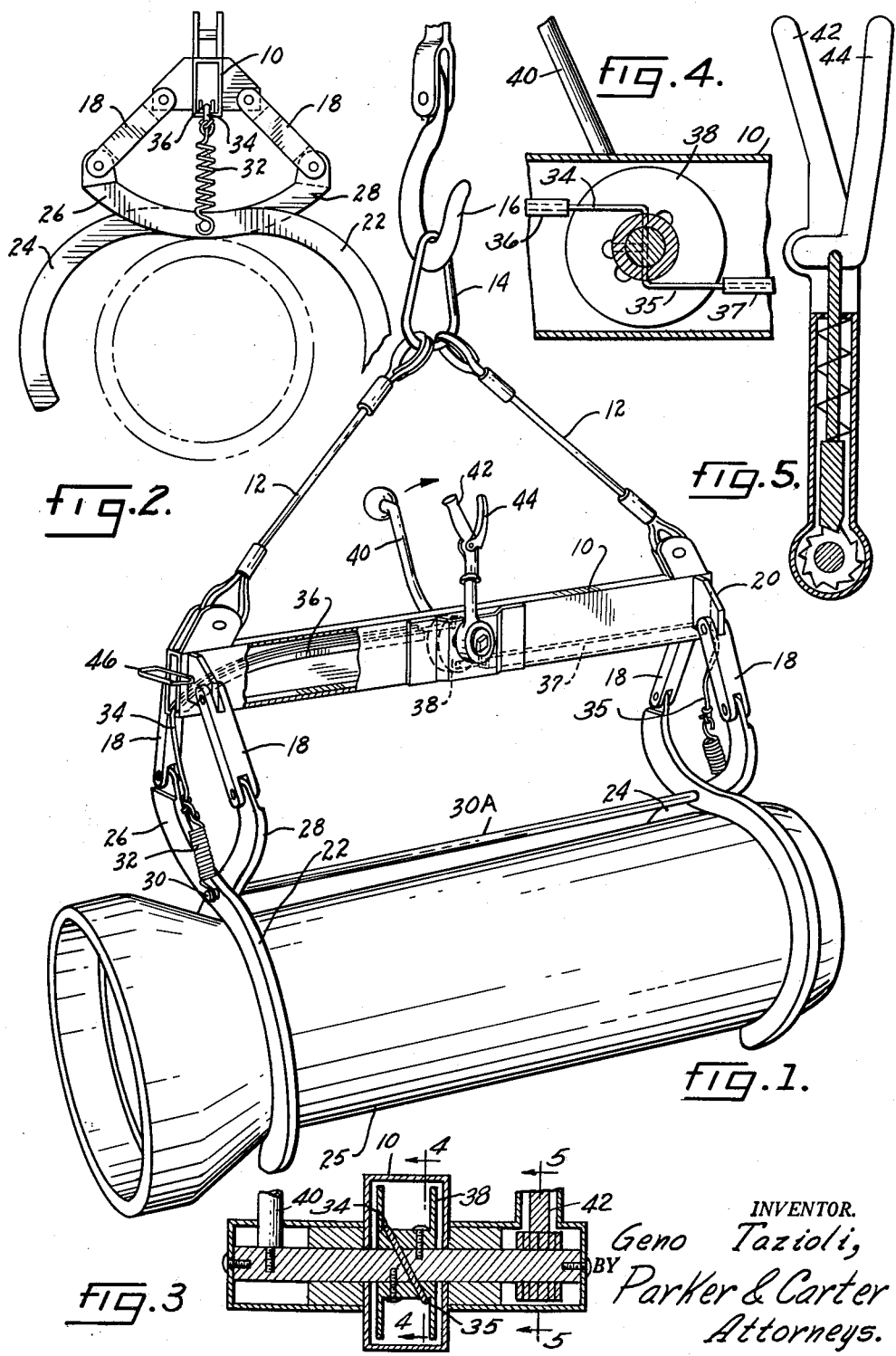
INVENTOR.
Geno Tazioli,
BY Parker & Carter
Attorneys.

ated Nov. 14, 1961

3,008,753
PIPE TONGS
Geno Tazioli, 734 Central St., Highland Park, Ill.
Filed Nov. 25, 1958, Ser. No. 776,228
5 Claims. (Cl. 294—118)

This invention relates to a device for handling and laying pipe, and is particularly adapted for use in laying large diameter pipes such as used in sewers and water mains.

One purpose of this invention is to provide a simply constructed device for handling and laying large diameter pipe.

Another purpose of the invention is to provide a pipe laying device which is easily operated.

Another purpose is to provide a pipe laying device which is adapted to be positioned longitudinally above a length of pipe.

Another purpose is to provide a device for laying large diameter pipe in a trench, the operation of which device does not require the trench to be dug any longer than the length of the pipe.

Another purpose is to provide a pipe laying device having a pair of manually operated tongs which are adapted to grasp a length of pipe.

Another purpose is to provide a pipe laying device adapted to be used with a crane or derrick.

Other purposes will appear from time to time in the course of the specification, drawings and claims.

The invention is illustrated more or less diagrammatically in the accompanying drawings, wherein:

FIGURE 1 is a perspective view of my pipe laying device holding a length of pipe, and FIGURE 2 is an end view of the device of FIGURE 1;

FIG. 3 is a detail longitudinal sectional view through a portion of the device shown in FIG. 1;

FIG. 4 is a detail sectional view taken substantially along the line 4—4 in FIG. 3; and FIG. 5 is a detail sectional view taken substantially along the line 5—5 in FIG. 3.

Referring now to the drawings, a hollow beam or frame 10 may be suspended by means of slings 12 and ring 14 from a suitable crane hook or the like 16. A pair of pivot links or link members 18 are pivotally mounted adjacent each end of the frame 10 by means of flanges 20 which project from opposite sides of the frame. Pivotally mounted on each of the pivot links 18 are handle extensions 26, 28 of tong members 22, 24. The tong members are curved so that they will fit around and grasp a pipe 25.

Each pair of tong members have a common pivot point 30 to which is attached one end of a spring 32. The other end of each spring is attached to cables 34, 35, which extend into the hollow portion of the frame 10 wherein they are guided by guide members or channels 36, 37. The guide members carry the cables to a pulley 38 mounted within the frame. The cables are mounted on diametrically opposed points of the pulley so that rotation of the pulley will simultaneously wind both cables. An actuating handle 40, connected to the pulley and extending outside the beam, is adapted to rotate the pulley. A ratchet lock device 42 also connected to the pulley is adapted to lock the pulley in any desired position. A release handle 44 mounted on the ratchet lock device 42 is adapted to release the lock and free the pulley for rotation. Handles 46 project outwardly from both ends of the hollow beam and are for use by the workmen in positioning my pipe laying device above a length of pipe.

The tongs and links and their pivoted relationship must be loose to avoid binding but in order that they may be held in general alignment a stabilizing bar 30A extends between the pivot points of the two tongs. This bar is normally parallel with the pipe and parallel with the frame.

The use and operation of my invention are as follows:

When laying pipe with a device such as disclosed herein the crane operator first positions the frame so that it is longitudinally disposed above a length of pipe. The workman on the ground or truck where the pipe is stored turns the crank or actuating handle in a clockwise direction which winds the cables around the pulley.

As the cables are wound around the pulley the springs attached to the pivot points of each of the tongs becomes tensioned and the pivot points move upward. The raising of the pivot points spreads the pivot links which in turn causes the tong members to move apart. The actuating handle on the crank is turned until the tong members are spaced far enough apart so that the tongs may slip around the length of pipe. When the tongs are spaced far enough apart the pulley is locked by means of the ratchet lock or other suitable locking device. The crane operator then proceeds to lower the device onto the length of pipe. When the tong members rest upon the top of the pipe, the workman merely unlocks the locking device, the weight of the lower part of the tong members and the spring action moving the tong members together until they lay flush against the sides of the pipe.

Next the crane operator raises the device and the length of pipe. The downward force of the pipe upon the bottom of the tong members pulls or forces the tong members closer together so that the pipe will be firmly grasped between them. The downward force of the pipe makes it impossible for the pipe to slip out of the grasp of the tong members because such a force tends to move the pivot links closer together which in turn moves the tong members closer together.

The pipe is now moved to the desired position in the trench, the crane operator positioning the pipe to the exact spot above the trench and then lowering the pipe down into the trench. The workman then takes the actuating handle and turns it so that the cables are wound around the pulley. This again tensions the spring and raises the pivot point which forces the tong members apart and releases the pipe. When the tong members are forced far enough apart so that they will slip around the pipe, the workman locks the pulley by means of the ratchet lock. The tongs are now left in the open or spaced apart position while the crane operator moves the device over to the next length of pipe. The device can then be lowered over a new length of pipe and the workman on the ground need only make sure the pipe is positioned correctly within the device and then release the ratchet lock. A new section of pipe will then be securely held in the device and be ready for placement in a trench.

There are many alterations, modifications and substitutions possible without departing from the scope of my invention. For example, the spring is shown attached to a cable which in turn is held by a guide member inside the frame. It would also be satisfactory to have the cable and pulley fastened to the outside of the frame. Also a series of spaced rings could be used in place of the guide members. My invention is similarly not limited to a ratchet lock as there are many other suitable types of locks which will perform the same function. Also, while I have shown the frame as being suspended by a pair of slings and a wire rope or cable from a crank hook, it should be understood that there are numerous other sling arrangements by which my device could be suspended. In the preferred form there are two pairs of tongs, each adjacent an end of the frame. It would also be satisfactory to have one or more additional pairs of tongs spaced between the ends to more evenly distribute the weight of the pipe on the frame.

For convenience, I have illustrated this device as applied to a short pipe. It will be understood that in many instances the pipe will be in length many times the length of the beam 10, in which case the hold of the tongs will be taken adjacent the center of gravity of the pipe.

I claim:

1. A device for handling and laying pipe or the like including a frame, a plurality of pairs of pivot links, each pair of pivot links being mounted on said frame in spaced relation to the adjacent pair of pivot links, a tong member pivotally mounted on each pivot link, each pair of tong members having a common pivot point between their ends, pulley and cable means on said frame for pivoting said tong members about said common pivot points, means for locking said tong members in any one position, means for releasing said tong members from said position, and means for suspending said frame from a crane or the like.

2. A device for handling and laying pipe or the like including a frame, a pair of pivot links pivotally mounted near each end of said frame, a tong member pivotally mounted on each pivot link, each pair of tong members having a common pivot point between their ends, a spring fastened to each of said common pivot points, pulley and cable means on said frame for tensioning said springs whereby said tong members are pivoted about said common pivot points, means for locking said tong members in any one position between the fully opened and fully closed positions of said tong members, means for releasing said tong members from said position, and means for suspending said frame from a crane or the like.

3. A device for handling and laying pipe or the like including a hollow frame, a pair of pivot links pivotally mounted near each end of said frame, a tong member pivotally mounted on each pivot link, each pair of tong members having a common pivot point between their ends, a spring fastened to each of said common pivot points, each of said springs also being fastened to a cable, a rotatable pulley mounted on said hollow frame, said cables being fastened to said pulley and adapted to be wound therearound in response to rotation of said pulley, a crank fastened to said pulley, means for locking said pulley in any one position, means for releasing said pulley, and means for suspending said frame from a crane or the like.

4. A device for handling and laying pipe or the like including a hollow frame, a pair of pivot links pivotally mounted near each end of said frame, a tong member pivotally mounted on each pivot link, each pair of tong members having a common pivot point between their ends, a spring fastened to each of said common pivot points, each of said springs also being fastened to a cable, a rotatable pulley mounted in said hollow frame, said cables being fastened to said pulley and adapted to be wound therearound in response to rotation of said pulley, a locking means for locking said pulley in any one position, means for releasing said locking means, and means for suspending said frame from a crane or the like.

5. A device for handling and laying pipe or the like including a hollow frame, a pair of pivot links pivotally mounted near each end of said frame, a tong member pivotally mounted on each link member, each pair of tong members having a common pivot point between their ends, a spring fastened to each of said common pivot points, each of said springs also being fastened to a cable, guiding means in said frame adapted to receive said cables, a rotatable pulley mounted in said hollow frame, said cables being fastened to said pulley and adapted to be wound therearound in response to rotation of said pulley, a crank fastened to said pulley, locking means adapted to hold said pulley in any one position, means for releasing said locking means, and means for suspending said frame from a crane or the like.

References Cited in the file of this patent

UNITED STATES PATENTS

| | | |
|---|---|---|
| 17,959 | Blood | Aug. 11, 1857 |
| 365,940 | Potter | July 5, 1887 |
| 1,737,614 | Peck | Dec. 3, 1929 |
| 2,378,570 | Mitchell | June 19, 1945 |
| 2,381,045 | Gammel | Aug. 7, 1945 |
| 2,626,178 | Campbell | Jan. 20, 1953 |
| 2,761,727 | Moore | Sept. 4, 1956 |